(12) United States Patent
Panse

(10) Patent No.: US 9,004,702 B2
(45) Date of Patent: Apr. 14, 2015

(54) DEVICE FOR COLLECTING SOLAR ENERGY

(76) Inventor: Sudhir V. Panse, Mumbai (IN)

( * ) Notice: Subject to any disclaimer, the term of this patent is extended or adjusted under 35 U.S.C. 154(b) by 202 days.

(21) Appl. No.: 13/808,458

(22) PCT Filed: Jul. 6, 2011

(86) PCT No.: PCT/IN2011/000450
§ 371 (c)(1),
(2), (4) Date: Feb. 20, 2013

(87) PCT Pub. No.: WO2012/004812
PCT Pub. Date: Jan. 12, 2012

(65) Prior Publication Data
US 2013/0222934 A1    Aug. 29, 2013

(30) Foreign Application Priority Data

Jul. 6, 2010   (IN) .................. 1939/MUM/2010

(51) Int. Cl.
*G02B 5/10* (2006.01)
*F24J 2/10* (2006.01)
*F24J 2/16* (2006.01)
*F24J 2/54* (2006.01)

(52) U.S. Cl.
CPC ................. *G02B 5/10* (2013.01); *F24J 2/1047* (2013.01); *F24J 2/16* (2013.01); *F24J 2/541* (2013.01); *F24J 2002/108* (2013.01); *F24J 2002/1085* (2013.01); *Y02E 10/52* (2013.01); *Y02E 10/47* (2013.01)

(58) Field of Classification Search
CPC ............ F24J 2002/10; F24J 2002/1066; F24J 2002/108; F24J 2002/1085; F24J 2/00; F24J 2/10; F24J 2/1047
USPC .................................................. 359/853, 855
See application file for complete search history.

(56) References Cited

U.S. PATENT DOCUMENTS 4,520,794 A  *  6/1985  Stark et al. .................... 126/684

* cited by examiner

*Primary Examiner* — Euncha Cherry
(74) *Attorney, Agent, or Firm* — Heena N. Kampani; Law Office of Heena N. Kampani

(57) ABSTRACT

A solar energy collector comprising a set of two or more reflectors reflecting sunrays at the focal line; a receiver of reflected rays placed at the focal line; and means to move the said set of reflectors along a non-parabolic concave curve. The said non-parabolic concave curve with reference to the focal line is defined by the formula: $x^2+y^2=\text{constant (k) y}$ where x and y are the co-ordinates of a point on the said non-parabolic concave curve, in the co-ordinate system, having X axis horizontal, Y axis vertical and the origin of said co-ordinate system on the focal line. The said focal line is perpendicular to the X-Y plane and wherein each of the said reflectors intersects said non-parabolic concave curve.

8 Claims, 6 Drawing Sheets

DEVICE FOR COLLECTING SOLAR ENERGY

FIELD OF INVENTION

The present invention relates to a solar collector comprising of plurality of reflectors, which concentrate incident parallel radiation on a line focus; and where the collected radiation is converted into high temperature heat by heating suitable heat transfer fluid, or into electricity by making it incident on an array of PV cells. Each reflector is critically positioned and oriented in three dimensions so that it intersects a non-parabolic concave curve and the reflectors are in different planes and are non-contiguous; but they overlap to form a contiguous reflecting surface. The solar tracking is easier in the invention, because the entire set of reflector strips is to be displaced together about the line of focus through an angular displacement, one third the angular displacement of the sun.

BACKGROUND OF THE INVENTION

Serious problems are associated with the predominantly prevalent technology of using fossil fuels for power production. Carbon emission on burning of these fuels causes environmental degradation and global warming. Their reservoirs are depleting fast and would not last long. Also, their major supply comes from a limited number of countries, mostly located in a small region of the world. This gives rise to fears about energy security, particularly among the developing countries. It is, therefore, necessary to develop an alternative, which will be free from these drawbacks. Solar Energy is an attractive possibility, because its supply is copious, it causes nil carbon emission, and its potential for producing power is enormous. Various attempts, consequently, have been done, and are being done, to harness solar energy by collecting and concentrating it.

The technologies available for concentrating solar energy are as follows;

a) Parabolic Trough Collectors (PTC), which concentrate solar rays at a focal line.

b) Fresnel Lenses (Reflecting Type), in which strips arranged in a two dimensional array over a large area of land, reflect solar rays incident on them towards the receiver pipe. Each strip is to be solar tracked separately.

c) A dish type parabolic reflector, where solar beam is concentrated at its focal point. It needs two way tracking.

d) Heliostats consist of small rectangular pieces of plane mirror, distributed in a two dimensional array over a large area of land and each such mirror is tracked separately throughout the day, such that all the reflected rays always hit the target, the target being the top chamber of a tower located at the center of the land.

Since the sun has continuous diurnal and seasonal movements in the sky, the angles of the incident solar rays upon the concentrators continuously vary. To accommodate this continuous change, various movable arrangements of reflecting surfaces, or receivers have been coupled with various control means to cause the reflecting surfaces or receivers, or both to automatically track the sun. The solar tracking for trough type collectors is along one axis. The dish needs a 'two-axes tracking'. This demands an elaborate support structure, and an elaborate mechanism to continuously follow the sun in the sky. Fresnel reflectors need tracking about one axis, but all the reflector strips here have to be held separately and rotated independently; because their orientations at any given time depend, on their positions, vis-a-vis the receiver pipe. This demands, again, an elaborate arrangement to hold and rotate the strips.

The solar collectors are essentially spread over large open grounds. They, therefore, have to negotiate high wind pressure under strong windy conditions. Their support structures in the present art, therefore, are required to be sturdy enough to withstand a heavy wind load. This adds to the cost of support structure.

To overcome these difficulties encountered in the present art, a solar collector with a simpler tracking arrangement and having a very small wind load even under strong windy conditions is required.

Another problem is regarding the requirement of land for a solar collector. The rectangular shaped reflectors in Solar Tower collectors occupy a large area of ground. Further, the said reflectors have to be spaced with sufficient intermediate gaps so as to avoid their shadows on one another. Similarly, in the case of Fresnel type collectors, sufficient gap needs to be provided between any two adjacent strips to avoid mutual blocking of rays by them.

As a result, the area of land required for a solar collector installation is far greater than the area of the solar field; i.e. the actual area, over which solar radiation is being captured by the collector. It is desirable, that the area of land required for a solar collector should not exceed much the area of the solar field.

It is thus, clearly evident from the foregoing description that although solar collector systems are potentially a highly desirable means for providing usable energy, there are many drawbacks associated with such systems. It would be beneficial to provide a solar collector system which is capable of substantially eliminating the problems encountered with past solar collectors.

PRIOR ART

The Prior Art Discloses The Following Solar Collectors:

The following prior art is for general reference on solar collectors only and in no way comes close to our Invention.

U.S. Pat. No. 7,672,549 B2/U.S. Pat. No. 7,925,129 B2/U.S. Pat. No. 7,664,350 B2 disclose a solar concentrator having elements for collecting input light, a reflective component with a plurality of incremental steps for receiving the light and also redirecting the light and a waveguide including a plurality of incremental portions enabling collection and concentration in electrical energy form.

Some of the problems associated with the above forms in the above prior Art are as follows;

All of them use Fresnel or objective lens, which are very costly. The intensity of light would decrease progressively because of large number of reflections in the wave guide, adversely affecting thereby the efficiency of the system. The device is intended to be used mainly for illumination purpose.

U.S. Pat. No. 7,667,833 B 1 discloses parabolic trough solar concentrator where a Theoretical Overlay Photographic (TOP) alignment method uses a theoretical projected image of a perfectly aligned concentrator on a photographic image of the concentrator to align the reflecting surface facets of a parabolic trough.

The problem associated with parabolic trough solar concentrator comprising at least two rows and at least one column of reflecting surface facets and linear receiver providing an alignment fixture of one or more off-axis camera positions for each row of the module. The procedure is cumbersome and tedious and refers to a parabolic curve. It is in no way closely connected to our invention.

U.S. Pat. No. 4,454,371 is the closest prior art where it discloses a plurality of concentrator arrays with each array being made up of a plurality of adjacent longitudinally extending concentrator modules. It forms a cylindrically shaped cover for protection from adverse environmental conditions. The concentrator is made up of a plurality of parallelogram shaped reflector panels mounted adjacent one another, which permits the ends of the panel to overlap adjacent modules so as to provide a continuous reflector surface.

The problem associated with the above form of solar concentrator is it provides a semi cylindrical housing and a semicircular enclosure which forms a protective covering, which increases the cost and there is no such housing and a cover in our invention.

There is no specific solar tracking protocol in the said invention and mentions only a 'standard procedure' in solar tracking, whereas we have a specific solar tracking protocol, which is different than the 'standard' one in the present art.

Also, plurality of rows of reflector are arranged with parallelogram shape reflecting surfaces in the said patent, which are housed one after other in the same plane. In our invention, on the other hand, the reflectors are non-contiguous and are arranged in different planes.

OBJECT OF THE INVENTION

One of the objects of the present invention is to provide a solar collector, for which the area of land required does not much exceed the solar field. This is achieved because, for tracking the sun, according to the invention, the collector is to be rotated about its focal line, through one third of the angle, through which the sun moves in the sky, thus requiring smaller extent of angular displacement of the collector during solar tracking. Also, in the present invention the reflectors are not spread in two dimensions, but are positioned in different planes in three dimensions, reducing the requirement of land area.

Yet another object of the present invention is to provide a system, which is aerodynamically designed configuration, which does not experience a high wind load even under strong windy conditions.

A further object of the present invention is to incorporate an efficient structural design, thereby offering a high stiffness to weight ratio which is economical to produce; and to utilize conventional, currently available components, resulting in cost savings, as well as standard mass production manufacturing techniques.

SUMMARY OF THE INVENTION

A solar energy collector comprises a set of two or more reflector strips reflecting sunrays at the focal line, a receiver of reflected rays placed at the focal line, a means to move the said set of reflectors along a non-parabolic concave curve. The said non-parabolic concave curve with reference to the focal line being defined by the formula:

$$\frac{x^2 + y^2}{y} = \text{constant } (k)$$

where x and y are the co-ordinates of a point on the said non-parabolic concave curve, in the co-ordinate system, having X axis horizontal, Y axis vertical and the origin on the focal line, the said focal line being perpendicular to the X-Y plane and wherein each of the said reflectors intersects said non-parabolic concave curve.

BRIEF DESCRIPTION OF THE FIGURES

The invention will now be described, with reference to the accompanying drawings wherein same numerals are used to denote the same parts. However, the drawings only illustrate the invention and in no way limit the invention.

In the accompanying drawings:

FIG. 6 (B): show position of the set of reflector strips at about 12 noon.

FIG. 6 (C): show position of the set of reflector strips at about 4 pm.

DETAILED DESCRIPTION OF THE INVENTION

In a preferred embodiment of the invention, the reflectors are in the shape of reflector strips, each of length 'l' and width 'w' and the intersecting point is the midpoint of 'w'.

Figure 1:
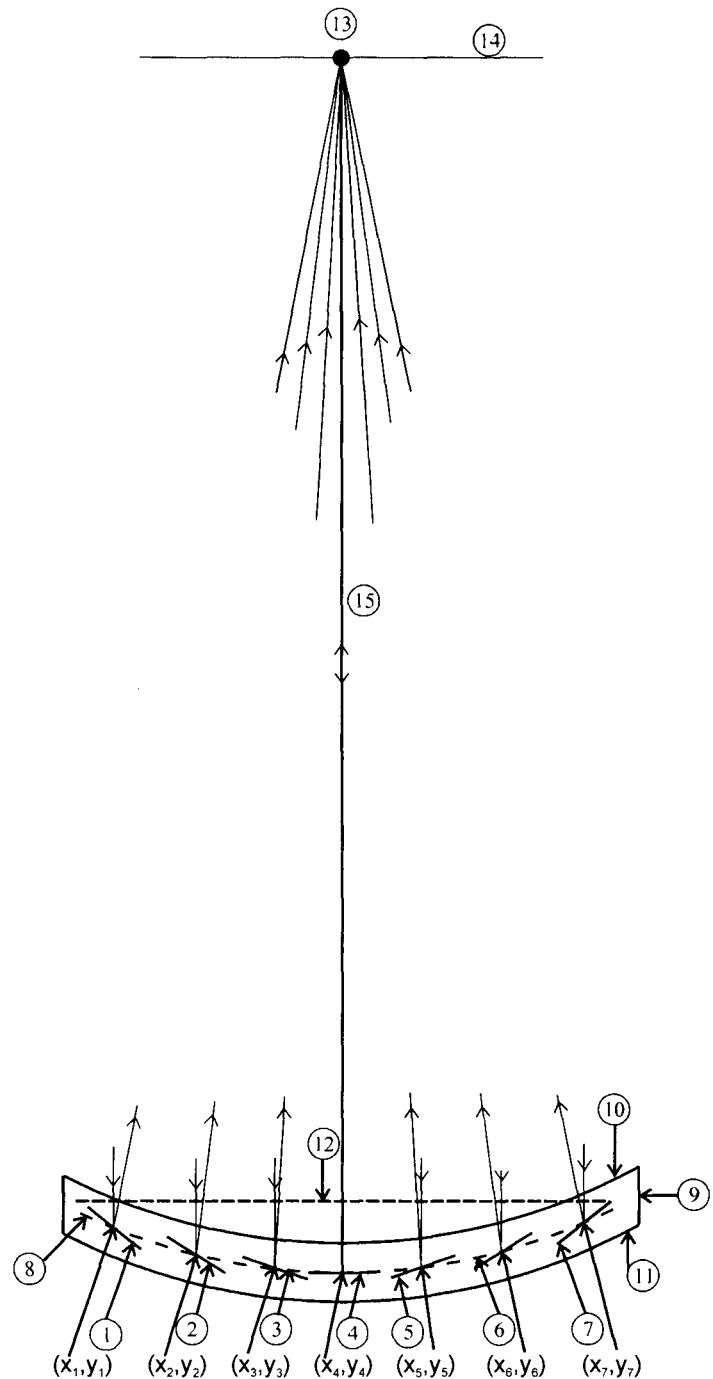
FIG. 1: show the schematic view of a holder having multiple reflectors.

FIG. 1, show seven reflector strips (1, 2, 3, 4, 5, 6, 7), intersecting a non-parabolic concave curve (8), at the points of intersection [($x_1$, $y_1$); ($x_2$, $y_2$); ($x_3$, $y_3$); - - - ($x_7$, $y_7$)] respectively. The non-parabolic concave curve (8) is defined presently.

The strips are held by a strip holder (9), by 'nut-and-bolt' method, or by welding, or by any one of the suitable holding means, which are well known in the art. The strip holder (9) are made of metal, or plastic, or any suitable, cost effective, hard or soft material. The strip holder (9) provides for holding the said reflector strips (1, 2, 3, 4, 5, 6, 7), in a non-parabolic concave curve same as the non-parabolic concave curve (8). The non-parabolic concave curve (8) has aperture (12). The focus of the collector is where the receiver (13) is placed. The reflector strips (1, 2, 3, 4, 5, 6, 7), and the receiver (13) are placed perpendicular to the plane of the diagram.

The co-ordinate system is so chosen so that the origin is at the receiver (13). The X and Y axes of the co-ordinate system are along the horizontal line (14) and vertical line (15) respectively. The said non-parabolic concave curve (8) is then given by the equation, $$\frac{x^2 + y^2}{y} = \text{constant } (k); \tag{i}$$

and all the intersecting points [($x_1$, $y_1$), ($x_2$, $y_2$), ($x_3$, $y_3$), - - - ($x_7$, $y_7$)] satisfy equation (i).

It is well-known in the branch of co-ordinate geometry, that the form of the equation connecting co-ordinates is system specific; and is reducible to the given form, when any other co-ordinate system is made to coincide with the given co-ordinate system. As an example, in an alternative description, if the X axis is taken along vertical line and Y axis is taken along horizontal line in the co-ordinate system described in the foregoing discussion, equation (i) would change to, $$\frac{x^2 + y^2}{x} = \text{constant } (k);\qquad\text{(ii)}$$

Equation (ii) would, however, reduce to equation (i), if the co-ordinate axes are again interchanged.

It is intended that equation (i) includes all such other forms of the equation corresponding to other possible co-ordinate systems, if the said other forms reduce to equation (i), when the respective co-ordinate systems are made to coincide with the one defined in the foregoing discussion. Also, term '$(x^2+y^2)$' in equation (i) is:

(a) Square of the shortest distance between the focus and the intersecting point of a reflector with the non-parabolic concave curve (8); Term 'y' in equation (i) is:

(b) Projection of the line joining the said two points on the vertical line (15).

Equation (i) is equivalent, therefore, to the condition that the ratio of the two terms (a) and (b), as defined in the foregoing discussion, is constant for points of intersection of all the reflector surfaces with the non-parabolic concave curve (8); which relation is independent of the co-ordinate system chosen.

FIG. 1 shows seven reflector strips (1, 2, 3, 4, 5, 6, 7). However, for the clarity and ease of drawing, a wide gap is shown between the reflector strips (1, 2, 3, 4, 5, 6, 7), in the FIG. 1.

In a preferable embodiment, however, the reflector strips, are more closely held, though in different planes, and they are more in numbers depending upon the size of the collector, so that the incident vertical radiation strikes one reflector strip or the next. Thus there is a gap between any two adjacent reflector strips, because they are in different planes; but they form a contiguous reflecting surface.

The reflector strips (1, 2, 3, 4, 5, 6, 7) are oriented in their positions according to a protocol, which ensures that the vertical rays, incident on all the points of intersection of the reflector strips (1, 2, 3, 4, 5, 6, 7) with the non-parabolic concave curve (8), [i.e. the points $(x_1, y_1); (x_2, y_2); ---(x_7, y_7)$] in FIG. 1) are reflected towards the receiver (13). The said protocol is described below, with reference to FIG. 2.

Figure 2:
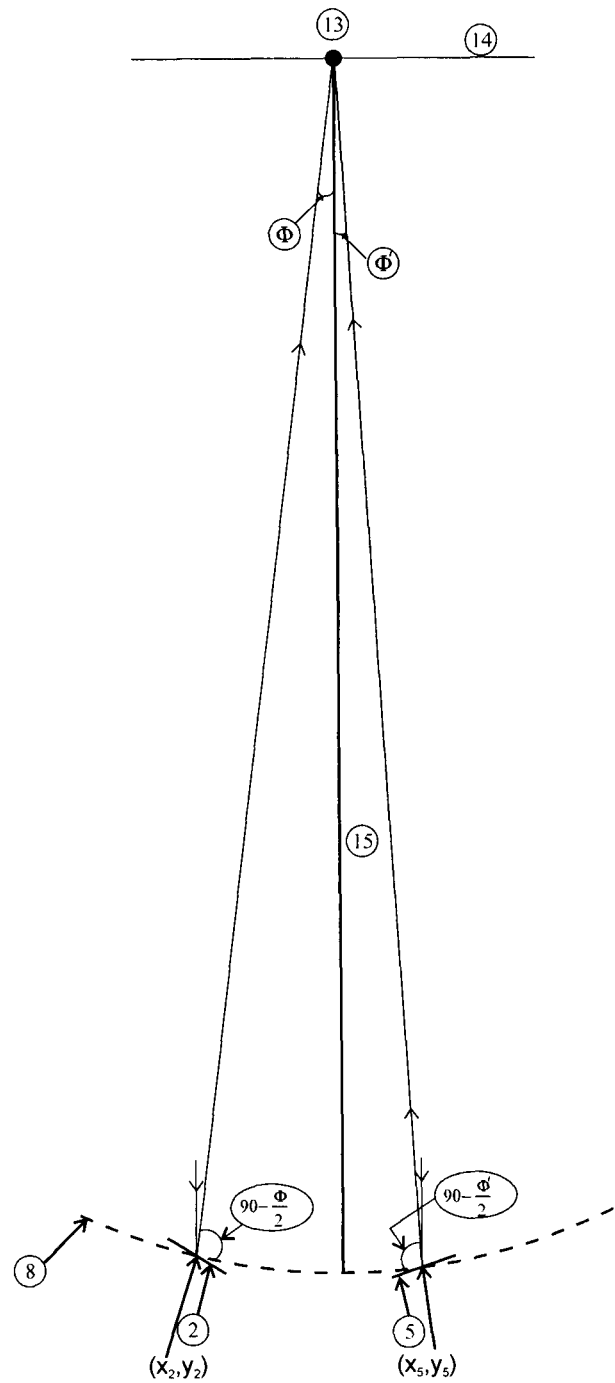
FIG. 2: show the schematic view with orientations of reflectors with the said holders, when incident rays are vertical.

FIG. 2 shows the non-parabolic concave curve (8), with two reflector strips (2 and 5) intersecting the said non-parabolic concave curve (8) at points $(x_1,y_1)$ and $(x_5,y_5)$. Only two reflector strips out of seven are shown in FIG. 2, because that number is sufficient to clarify the protocol for orientation; and also it adds to the clarity of the figure.

The reflector strip (2) is so oriented that, if the angle between vertical line (15) and the line joining receiver (13) to the point of intersection $(x_2, y_2)$ is Ø, then the width of the reflector strip (2) makes an angle of (90-Ø/2) with the said line joining the receiver (13) to the point of intersection; and the reflecting surface is facing the receiver (13).

Similarly, if the angle between vertical line (15) and the line joining receiver (13) to the point of intersection $(x_5, y_5)$ is Ø', then the width of the reflector strip (5) makes an angle of (90-Ø'/2) with the said line joining the receiver (13) to the point of intersection (x5, y5); and the reflecting surface is facing the receiver (13).

Same protocol is followed for all the reflector strips (1, 2, 3, 4, 5, 6, 7). The said protocol ensures that vertical rays incident on the said point of intersections of the respective strips (1, 2, 3, 4, 5, 6, 7) are reflected towards the receiver (13). Consequently, the rays incident vertically on the collector through its aperture (12) are concentrated on the receiver (13).

A novel feature of the non-parabolic concave curve (8) and the reflector strips (1, 2, 3, 4, 5, 6, 7), positioned and orientated as per the protocol described in the foregoing discussion concentrating a vertical parallel beam at the receiver (13), is that the entire set of reflector strips (1, 2, 3, 4, 5, 6, 7), is to be rotated through (Θ/3) in the vertical plane about the receiver (13) along the non-parabolic concave curve (8), if the incident parallel beam rotates through Θ in the vertical plane, to ensure that the rays are again concentrated at the receiver (13).

Figure 3A:
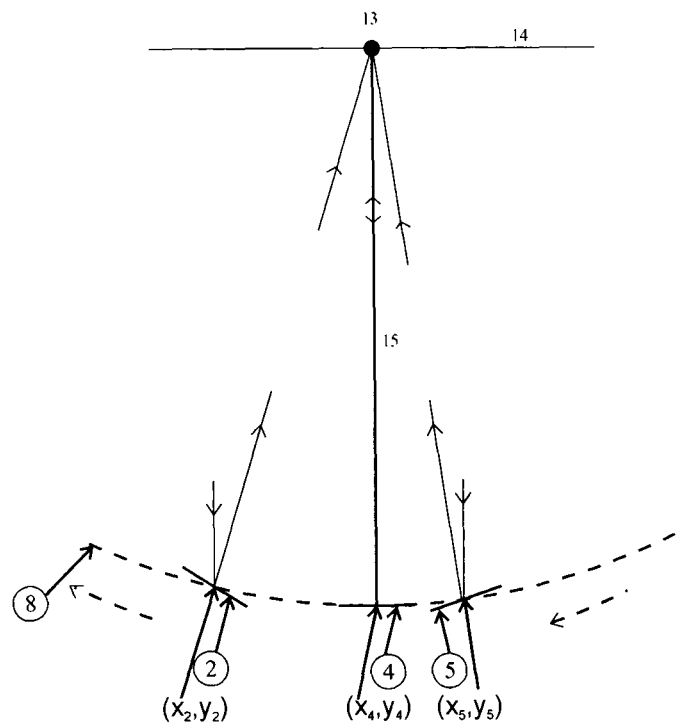
FIGS. 3 (A) and 3 (B): show the required angular displacement of the set of reflector strips vis-à-vis the angular displacement of the sun.
Figure 3B:
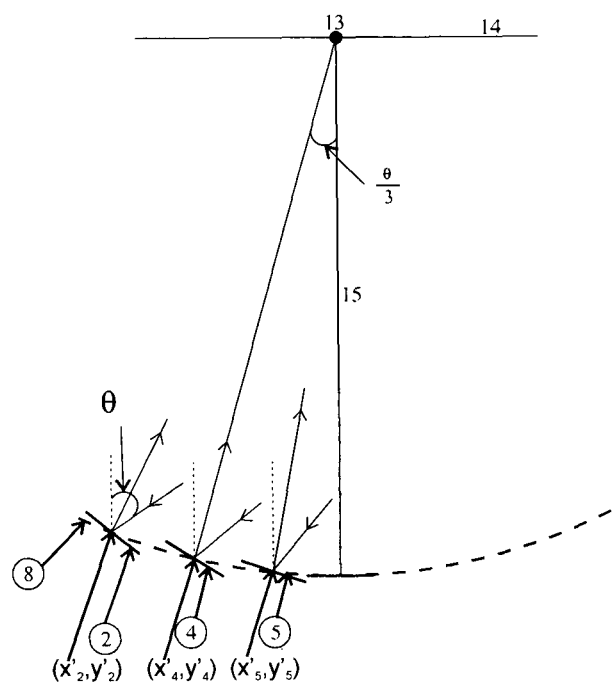

This feature is shown in FIGS. 3(A) and 3 (B), where only three reflector strips (2, 4 and 5) are shown, which number is sufficient to explain the feature; and it retains the clarity in the figure. FIG. 3(A) shows the original position of the set of reflector strips (2, 4 and 5), when the vertically incident beam is concentrated at the receiver (13).

FIG. 3 (B) shows the position of the said set displaced through an angle (Θ/3) in the vertical plane about the receiver (13). The said three reflector strips (2, 4 and 5) take new positions on the non-parabolic concave curve (8) and their new orientations are different than the original; and they now concentrate a parallel beam making an angle (Θ) with the vertical line (15), at the receiver (13).

For the working of the collector a necessary condition, therefore, is that the strip holders (9 and 9 A) are maintained in the vertical plane, and are able to undergo angular displacements not exceeding ±30° in the vertical plane about the receiver (13). To ensure that this condition is satisfied fixtures in the form of stands (16 and 16A) for strip holders (9 and 9A) are used as shown in FIG. 4.

Figure 4:
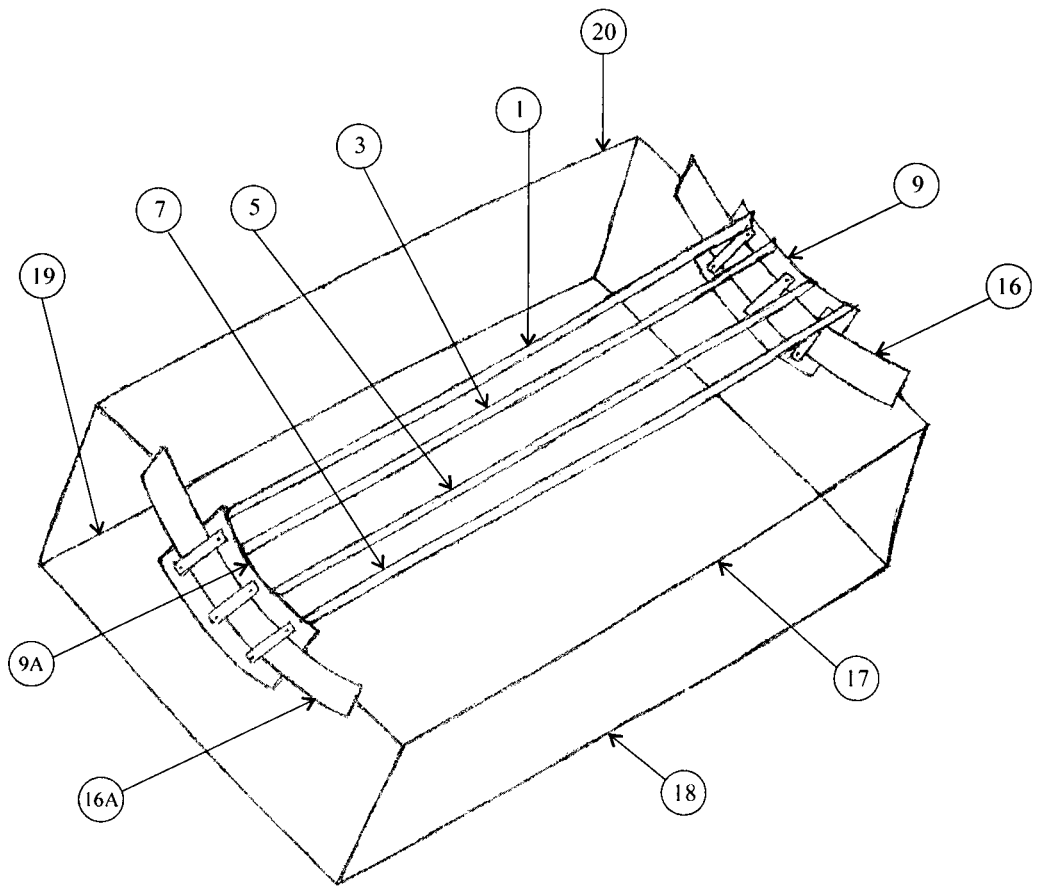
FIG. 4: show an exploded view of the preferable embodiment of the collector.

FIG. 4 show an exploded view of one embodiment of the collector. It shows only four reflector strips (1,3, 5 and 7), for retaining clarity in the figure. The said strips (1,3, 5 and 7) are fixed at their ends, to the two strip holders (9 and 9A), as per the protocol described earlier. The said strip holders (9 and 9A) are held in the vertical plane with the help of two stands (16 and 16A), and the distance (l) between the said stands (16 and 16A) is maintained by the spacer rods (17, 18, 19 and 20). The figure does not include the stationary receiver (13) placed at the focus; and the means to rotate the strip holders (9 and 9A) along the stand.

Figure 5:
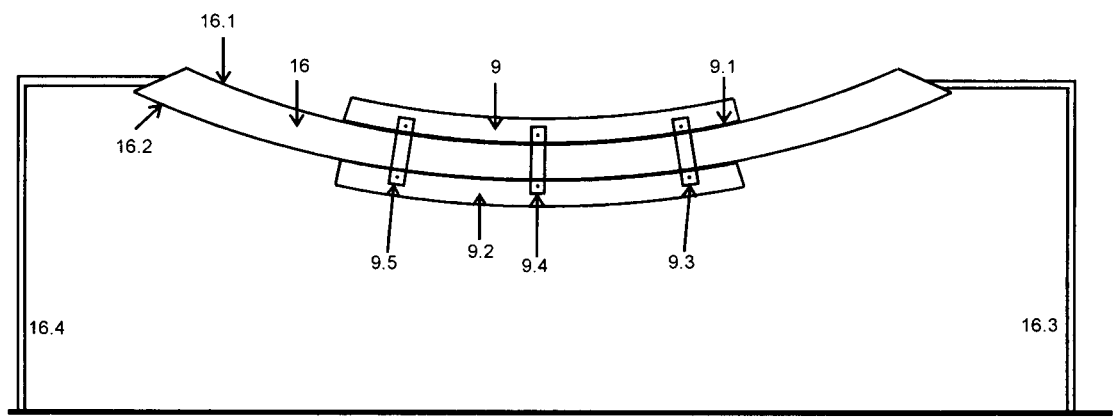
FIG. 5: show the preferable embodiment of strip holder and stand for strip holder.

The detail of one embodiment of strip holder (9) and stand (16) for strip holder (9); and the method of coupling the two are explained presently with reference to FIG. 5.

FIG. 5 shows an exploded view of one embodiment of a strip holder (9) coupled to a stand (16). The stand (16) in FIG. 5 is a rigid body, with inner border (16.1) and outer border (16.2). The said inner and outer borders are preferably of same shape as non-parabolic concave curve (8). The strip holder (9) has its outer border (9.1) just fitting on the inner border (16.1). Also a guiding fixture (9.2) of the same shape is fitted on the outer border (16.2). The holder (9) and the guiding fixture (9.2) are fastened to each other at some intermittent points with the help of fastening strips (9.3, 9.4, and 9.5).

Consequently, the stand (16) is sandwiched between the strip holder (9) and guiding fixture (9.2); and the said assembly of strip holder (9) and guiding fixture (9.2) can slide smoothly over stand (16). The supports (16.3 and 16.4) at the sides elevates the stand (16) at a convenient height from the ground. Thus it is ensured that the set of reflector strips (1,2,3,4,5,6,7) undergo an angular displacement in the vertical plane, when the strip holder (9) slides smoothly over the stand (16). Also, the expanse of the stand (16) is sufficiently big, to allow for the required maximum angular displacement of the strip holder (9).

Since for solar tracking, each reflecting strip is not to be rotated independently, but a single angular movement of the entire set of strips attached to the holders (9 and 9A) is to be done together, the tracking is easier.

There is essentially a gap between any two adjacent strips in the collector. Consequently, it does not have to negotiate high wind pressure, even under strong windy conditions. Also, the shadow of any one strip on its adjacent strip is either zero, or negligible. Thus, the reflectors are non-contiguous, but they form a contiguous reflecting surface.

It will be appreciated that many modifications and substitutions of elements specifically described herein in connection with the tool of present invention may be made by those of ordinary skill in the art. These may, for example, include dimensional modifications made to accommodate different solar collector sizes, construction materials or shapes. Such modifications falling within the spirit and scope of the present invention are intended to be covered.

WORKING OF THE INVENTION

FIGS. 6 (A), 6(B) and 6(C) schematically show one embodiment of a collector, where only three reflecting strips (2, 4, 6) are shown for the sake of retaining clarity in the figure. The said strips (2, 4, 6) intersect the non-parabolic curve (8) given by equation (i); and are oriented as per the protocol described in the foregoing discussion.

Let the receiver (13) be placed at the focus, perpendicular to the plane of the diagram. Also, the said strips (2, 4, 6) are placed lengthwise along N-S direction and perpendicular to the plane of the diagram, so the E-W tracking is to be done.

FIG. 6 (A) shows that at about 8 am (local time) the hour angle of the sun is 60° with the vertical towards east. The entire set of the said strips (2, 4, 6) is, therefore, positioned at an angle of 20° from the vertical towards west. The said strips (2, 4, 6) then get positioned and oriented, ensuring that all the incident solar rays inclined at an angle of 60° with the vertical towards east are reflected by the said strips (2, 4, 6) towards the receiver (13).

The 'hour angle' of the sun changes uniformly at the rate of 15° per hour from east to west. Consequently, the entire set of said strips (2, 4, 6) is to be rotated about the receiver uniformly at the rate of 5° per hour towards east by using a 'motor and gear' arrangement, or by using a clock mechanism, or by any other suitable rotor means, known in the art.

Figures 6A, 6B, 6C:
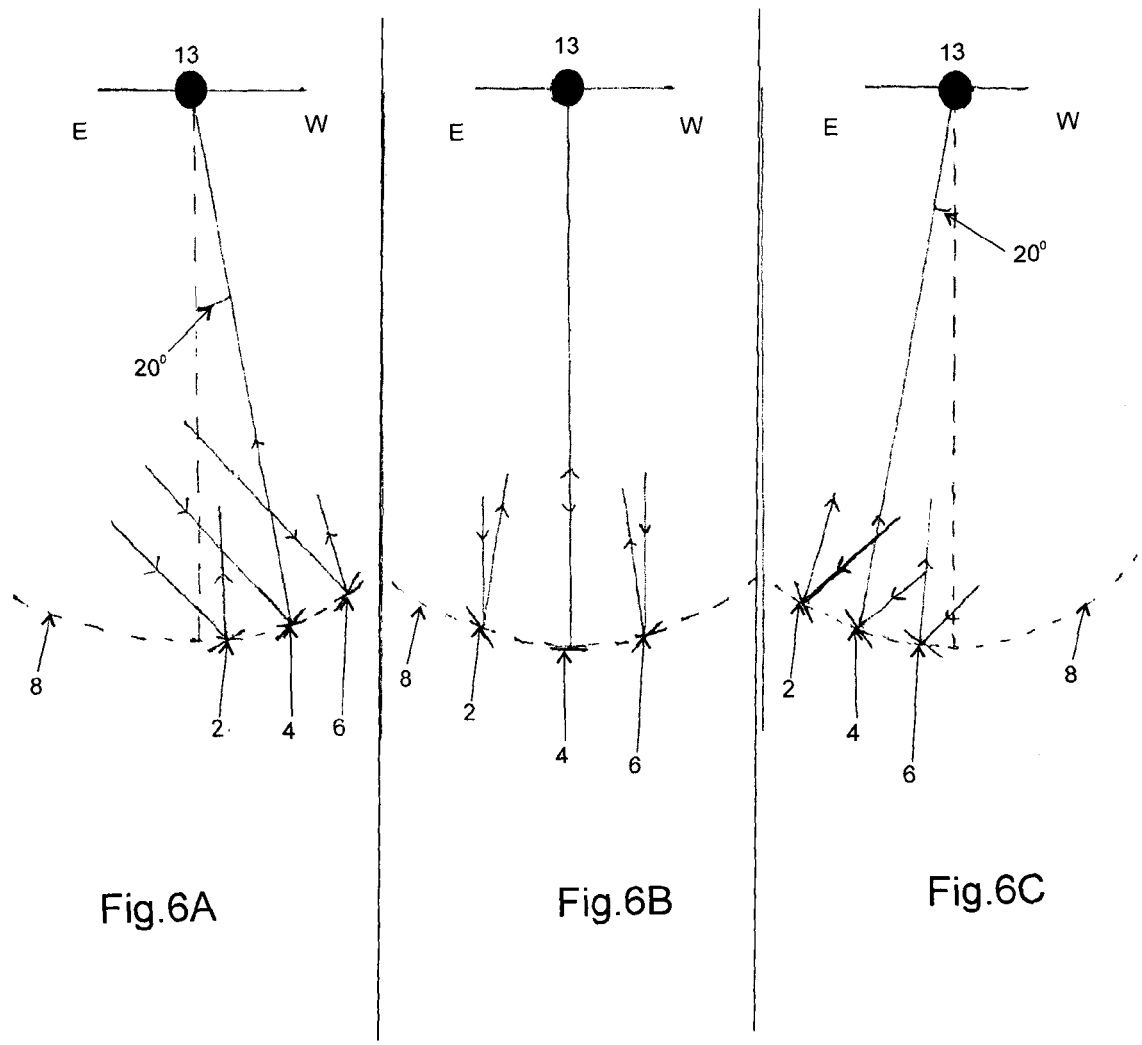
FIG. 6 (A): show position of the set of reflector strips at about 8 am.

The situation at about 12 noon is shown in FIG. 6B. Solar rays are incident vertically. The set of strips (2, 4, 6) has moved through an angle of 20° about the receiver (13) towards east from the position of the said set at about 8 am.

The solar rays incident on all the said strips (2, 4, 6) are reflected towards the receiver (13).

The situation at 4 pm is shown in FIG. 6C. The solar rays are incident inclined at an angle of 60° with the vertical towards west. The set of said strips (2, 4, 6) is therefore moved through an angle of 20° about the receiver (13) towards east from the position of the said set at about 12 noon. The solar rays incident on all the strips (2, 4, 6) are reflected towards the receiver (13).

If the strips are placed lengthwise along E-W direction, the tracking is to be done along N-S direction. The angle of inclination of the set of reflector strips (2, 4, 6) in the vertical plane and about the focus, is to be changed by one third the change in the angle of declination of the sun.

Thus, the reflected rays always get focused at the stationary receiver (13), where either temperature of a circulating fluid is raised high, or direct steam generation takes place, or electric power is generated using an array of PV cells.

Advantages:

1. Thus one advantage of the present invention is that it is an efficient solar concentrator, which does not require non-parabolic concave curve (8) reflecting surfaces and which is capable of producing a high concentration of solar energy.

2. Another advantage of the present invention is that it is a solar concentrator, where plane reflector surface strips are not spread in two dimensions over the ground; but are positioned in three dimensions with the help of designed holders for the strips, so that the actual area of the land covered by reflector surface strips is less than area of the solar field.

3. The collector in the present invention comprises multiplicity of reflector strips, positioned in different planes and in three dimensions, with a gap between any two adjacent strips. This reduces the wind load on the collector.

4. Another advantage of the present invention is that it is a solar concentrator, where solar tracking is simpler because a single movement for the holders of the set of reflector strips at any instant displaces and reorients all the reflector strips to give the desired result.

5. Another advantage of the present invention is that it is a solar concentrator, which will not have to negotiate high wind pressures, even under strong windy conditions due to aerodynamically designed configuration.

I claim:

1. A solar energy collector comprising a set of two or more reflectors reflecting sunrays at the focal line, a receiver of reflected rays placed at the focal line, means to move said set of reflectors along a non-parabolic concave curve (8), said non-parabolic concave curve (8) with reference to the focal line being defined by the formula:

$$\frac{x^2 + y^2}{y} = \text{constant } (k)$$

where x and y are the co-ordinates of a point on said non-parabolic concave curve (8), in the co-ordinate system, having X axis horizontal (14), Y axis vertical (15) and the origin of said co-ordinate system on the focal line, said focal line being perpendicular to the X-Y plane and wherein each of said reflectors intersects said non-parabolic concave curve (8).

2. A solar energy collector as claimed in claim 1 above wherein, said set of reflectors is moved by known means through an angular displacement of +1° about the line of focus whenever the sun undergoes an angular displacement of +3° in the sky.

3. A solar energy collector as claimed in claim 1 above wherein, the reflectors in said set are non-contiguous and are in different planes.

4. A solar energy collector as claimed in claim 3 above wherein, said reflectors in different planes overlap to form a contiguous reflecting surface.

5. A solar energy collector as claimed in claim 1 above wherein, the reflectors are longitudinal strips.

6. A solar energy collector as claimed in claim 1 above wherein the reflectors are longitudinal strips, the intersecting point of each reflector is a midpoint along the width of the longitudinal strip.

7. A solar energy collector as claimed in claim 5 above wherein, the reflectors are flat.

8. A solar energy collector as claimed in claim 1 above wherein, if 0 is the angle between the vertical line and the line joining the focus to the point of intersection of the reflectors with the non-parabolic concave curve (8), then the width of the reflectors makes an angle of (90-Ø/2) with said line, ensuring that the rays vertically incident on the reflectors get reflected towards the focal-line.

* * * * *